US009626045B1

(12) United States Patent
Yilmaz

(10) Patent No.: US 9,626,045 B1
(45) Date of Patent: Apr. 18, 2017

(54) POSITION-SENSING PANEL AND RELATED METHODS

(75) Inventor: Esat Yilmaz, Chandler's Ford (GB)

(73) Assignee: Atmel Corporation, San Jose, CA (US)

( * ) Notice: Subject to any disclaimer, the term of this patent is extended or adjusted under 35 U.S.C. 154(b) by 758 days.

(21) Appl. No.: 12/891,329

(22) Filed: Sep. 27, 2010

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/041* (2013.01); *G06F 3/045* (2013.01); *G06F 3/0412* (2013.01); *G06F 3/0416* (2013.01)

(58) Field of Classification Search
USPC ...................... 345/173–174; 178/18.01–20.04
See application file for complete search history.

(56) References Cited

U.S. PATENT DOCUMENTS

| | | | |
|---|---|---|---|
| 5,194,852 A * | 3/1993 | More et al. ................... 345/182 |
| 6,657,616 B2 * | 12/2003 | Sims ............................ 345/173 |
| 7,202,895 B2 * | 4/2007 | Hirai ............................ 348/272 |
| 7,663,607 B2 | 2/2010 | Hotelling |
| 7,864,503 B2 | 1/2011 | Chang |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,217,902 B2 | 7/2012 | Chang |
| 8,243,027 B2 | 8/2012 | Hotelling |
| 2002/0097231 A1* | 7/2002 | Satoh et al. .................. 345/177 |
| 2004/0239650 A1* | 12/2004 | Mackey ....................... 345/174 |
| 2005/0207273 A1* | 9/2005 | Newman et al. ............. 366/314 |
| 2007/0074914 A1* | 4/2007 | Geaghan et al. .......... 178/18.06 |
| 2007/0229470 A1* | 10/2007 | Snyder et al. ................ 345/173 |
| 2007/0279395 A1* | 12/2007 | Philipp et al. ............... 345/173 |
| 2008/0309633 A1* | 12/2008 | Hotelling et al. ............ 345/173 |
| 2008/0309635 A1 | 12/2008 | Matsuo |
| 2009/0159344 A1* | 6/2009 | Hotelling et al. ......... 178/18.06 |
| 2009/0194344 A1* | 8/2009 | Harley et al. ............. 178/18.06 |
| 2009/0315854 A1 | 12/2009 | Matsuo |
| 2010/0045632 A1 | 2/2010 | Yilmaz et al. |
| 2010/0110038 A1* | 5/2010 | Mo et al. ...................... 345/174 |
| 2010/0265187 A1 | 10/2010 | Chang et al. |
| 2010/0302201 A1* | 12/2010 | Ritter et al. .................. 345/174 |
| 2011/0095990 A1* | 4/2011 | Philipp et al. ................ 345/173 |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.

(Continued)

*Primary Examiner* — Jonathan Boyd
*Assistant Examiner* — Sosina Abebe
(74) *Attorney, Agent, or Firm* — Baker Botts L.L.P.

(57) ABSTRACT

An exemplary touch position-sensing panel has first and second electrodes that cross over each other to form touch sensing nodes at their intersections. Cut-outs are formed in the first electrodes at touch sensing nodes. The cut-outs extend at least partially across the region where second electrodes cross over the first electrode.

21 Claims, 8 Drawing Sheets

(56) References Cited

U.S. PATENT DOCUMENTS

| | | | |
|---|---|---|---|
| 2011/0109583 A1* | 5/2011 | Lee | G06F 3/044 345/174 |
| 2012/0113014 A1 | 5/2012 | Yilmaz | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |

OTHER PUBLICATIONS

U.S. Appl. No. 61/454,950, filed Mar. 21, 2011, Lynch.
U.S. Appl. No. 61/454,894, filed Mar. 21, 2011, Rothkopf.
Yilmaz, U.S. Appl. No. 12/939,794, Non-final Rejection from U.S. Patent and Trademark Office, Oct. 4, 2012.
Yilmaz, U.S. Appl. No. 12/939,794, Response to Non-final Rejection from U.S. Patent and Trademark Office, Feb. 4, 2013.
Yilmaz U.S. Appl. No. 12/939,794, Final Rejection from U.S. Patent and Trademark Office, May 9, 2013.
Yilmaz, U.S. Appl. No. 12/939,794, Request for Continued Examination and Response, Sep. 9, 2013.

\* cited by examiner

POSITION-SENSING PANEL AND RELATED METHODS

BACKGROUND

A position sensor can detect the presence and location of a touch by a finger or by an object, such as a stylus, within an area of an external interface of the position sensor. In a touch sensitive display application, the position sensor enables direct interaction with information displayed on the screen, rather than indirectly via a mouse or touchpad. Position sensors can be attached to or provided as part of devices with a display, including but not limited to computers, personal digital assistants (PDAs), satellite navigation devices, mobile telephones, portable media players, portable game consoles, public information kiosks, and point of sale systems. Position sensors have also been used as control panels on various appliances.

There are a number of different types of position sensors/touch screens, such as resistive touch screens, surface acoustic wave touch screens, capacitive touch screens etc. A capacitive touch screen, for example, may include an insulator, coated with a transparent conductor in a particular pattern. When an object, such as a finger or a stylus, touches the surface of the screen there is a change in capacitance. This change in capacitance is measured by a controller and processed to determine the position of the touch.

In a mutual capacitance configuration, for example, an array of conductive drive electrodes or lines and conductive sense electrodes or lines arranged in two separate spaced apart layers can be used to form a touch screen having capacitive nodes. A node is formed at each intersection of drive and sense electrodes. The electrodes cross at the intersections but are separated by an insulator so as to not make electrical contact. In this way, the sense electrodes are capacitively coupled with the drive electrodes at the intersection nodes. A pulsed or alternating voltage applied on a drive electrode will therefore induce a charge on the sense electrodes that intersect with the drive electrode. The amount of induced charge is susceptible to external influence, such as from the proximity of a nearby finger. When an object touches the surface of the screen, the capacitance change at every individual node on the grid can be measured to determine the location or position of the touch.

SUMMARY

Disclosed are various examples of a touch position-sensing panel having first and second electrodes which cross over each other to form touch sensing nodes at their intersection. Cut-outs are formed in the first electrodes at touch sensing nodes. The cut-outs extend at least partially across the region where second electrodes cross over the first electrode.

BRIEF DESCRIPTION OF THE FIGURES

The figures depict one or more implementations in accordance with the present teachings, by way of example only, not by way of limitation. In the figures, like reference numerals refer to the same or similar elements.

DETAILED DESCRIPTION

In the following detailed description, numerous specific details are set forth by way of examples in order to explain the relevant teachings. In order to avoid unnecessarily obscuring aspects of the present teachings, those methods, procedures, components, and/or circuitry that are well-known to one of ordinary skill in the art have been described at a relatively high level.

Reference now is made in detail to the examples illustrated in the accompanying figures and discussed below.

A display may be overlaid with a position-sensing panel. The display may take various forms. Examples include, but are not limited to liquid crystal displays such as an active matrix liquid crystal display, an electroluminescent display, an electrophoretic display, a plasma display, cathode-ray display, an OLED display, or the like. It will be appreciated that light emitted from the display should be able to pass through the position-sensing panel.

Figure 1:
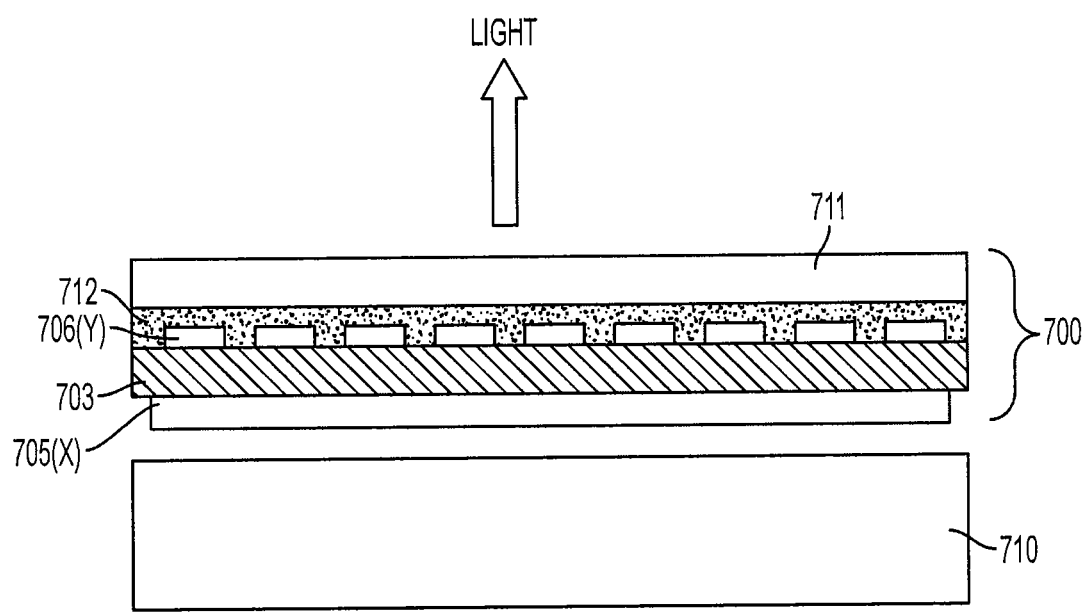
FIG. 1 illustrates schematically a cross-section of an exemplary position sensing panel.

FIG. 1 illustrates an exemplary touch position-sensing panel 700 which overlies a display 710. In one example, the panel 700 includes a substrate 703. The panel 700 can also include a first 705(X) electrode and second 706(Y) electrode. The substrate 703 has a surface on each side. The electrodes 705(X) and 706(Y) may be formed on opposing surfaces of the substrate 703. The substrate 703 may be provided adjacent to the display 710 such that one electrode 705(X) is between the display 710 and the substrate 703. An air gap is formed between the display 710 and the first electrode 705(X) and an adhesive layer 712 can be disposed between the second electrode 706(Y) and the transparent cover layer 711.

In other examples, the touch position-sensing panel may have a second substrate (not shown). With a second substrate, a touch position-sensing panel may have a transparent panel, a first adhesive layer on the panel, a first electrode layer forming first electrodes, a first substrate, a second adhesive layer, a second electrode layer forming second electrodes, and the second substrate. In such an example, the first conductive electrode layer is attached to the first substrate and the second conductive electrode layer is attached to the second substrate.

Substrate 703, which forms a core of the exemplary position-sensing panel 700, can be formed from a transparent, non-conductive material such as glass or a plastic. Examples of suitable plastic substrate materials include, but are not limited to, Polyethylene terephthalate (PET), Polyethylene Naphthalate (PEN), or polycarbonate (PC).

In other examples, the panel structure and production methodology may be utilized in other types of touch position-sensing panels. Hence, in the example, drive electrodes 705(X) are provided on one surface of the substrate 703, and sense electrodes 706(Y) are provided on the opposing surface of the substrate 703. Capacitive sensing channels or nodes are formed by capacitive coupling in the localized regions where the drive electrodes 705(X) and the sense electrodes 706(Y) cross over each other on opposites sides of the non-conductive substrate 703.

Transparent cover layer 711 is provided over the substrate 703, and may be joined thereto by any methods and materials. One exemplary material is a pressure-sensitive adhesive. In one example, the cover layer 711 may be glass, polycarbonate, or Poly(methyl methacrylate).

Indium-tin-oxide (ITO) is an example of a clear conductive material that can be used to form the sets of electrodes, e.g. for the drive electrodes 705(X) and the sense electrodes 706(Y) in the example of FIG. 1. Alternatively, any other clear conductive material may be used, such as other inorganic and organic conductive materials, such as Antimony-tin-oxide (ATO), tin oxide, PEDOT or other conductive polymers, carbon nanotube or metal nanowire impregnated materials, and the like. Further, opaque metal conductors may be used such as a conductive mesh, which may be of copper, silver or other conductive materials.

Figure 2:
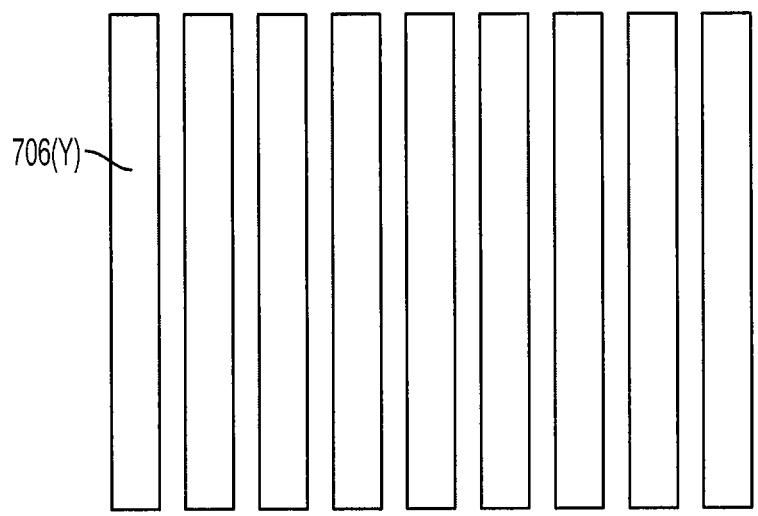
FIG. 2 illustrates schematically a set of sense electrodes.

With reference to FIG. 2, a set of sense electrodes 706(Y) are shown in isolation from the rest of the position-sensing panel. As shown, each sense electrode 706(Y) has a solid area of ITO. The sense electrodes can be formed and shaped into a rectangular area. Other shapes can be used. For example, the sense electrodes can be tapered.

Figure 3A:
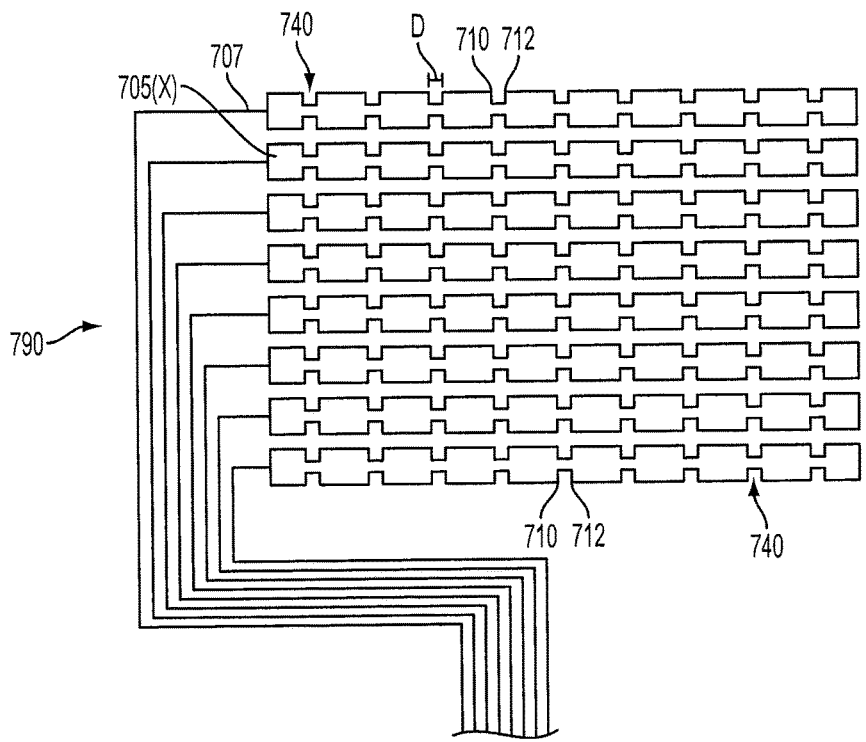
FIG. 3A illustrates schematically a set of drive electrodes for an exemplary position sensing panel.

With reference to FIG. 3A, a set of drive electrodes 705(X) is shown in isolation from the rest of the position-sensing panel. In the illustrated example each drive electrode 705(X) has solid areas of ITO that together cover substantially an active area of the position-sensing panel, except in regions between the drive electrodes and the cut-out regions 740. In some examples, the drive electrodes 705(X) have a width of from about 3 mm to about 12 mm depending on design.

Figure 3B:
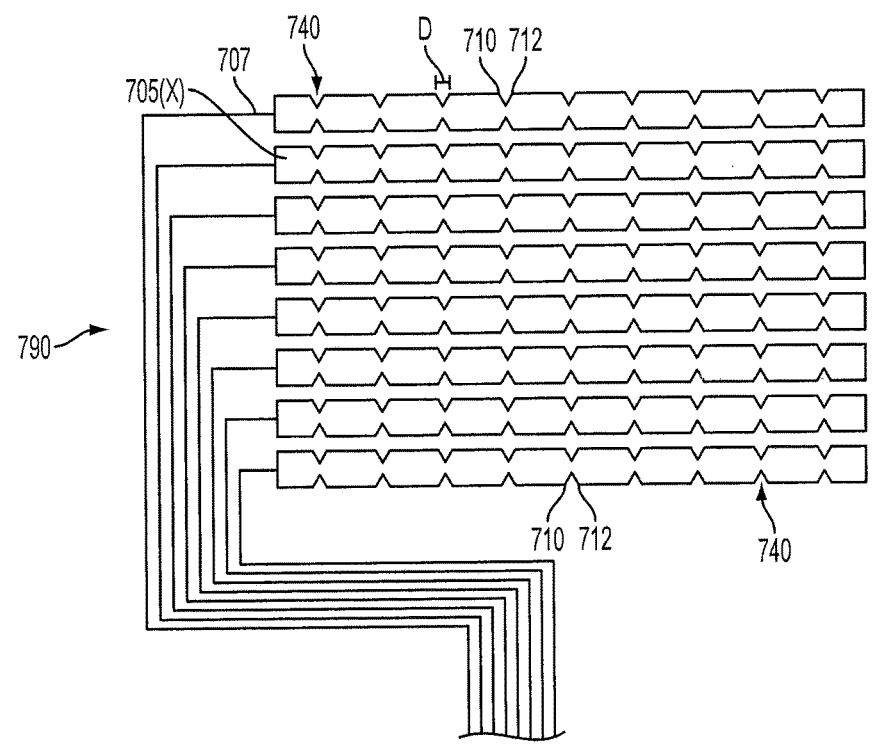
FIG. 3B illustrates schematically another set of drive electrodes for an exemplary position sensing panel.
Figure 3C:
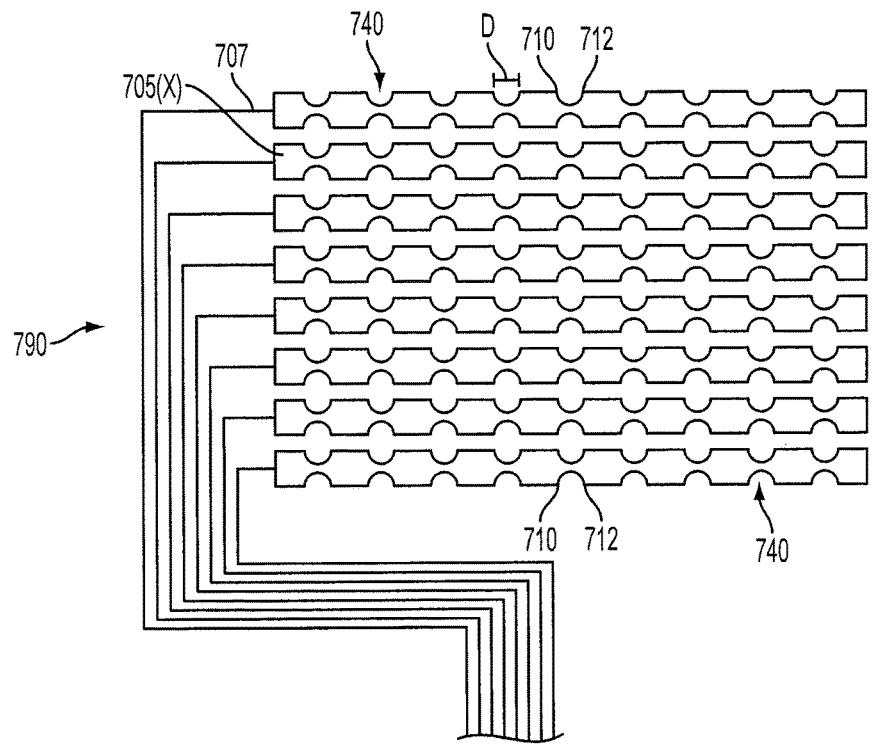
FIG. 3C illustrates schematically another set of drive electrodes for an exemplary position sensing panel.
Figure 3D:
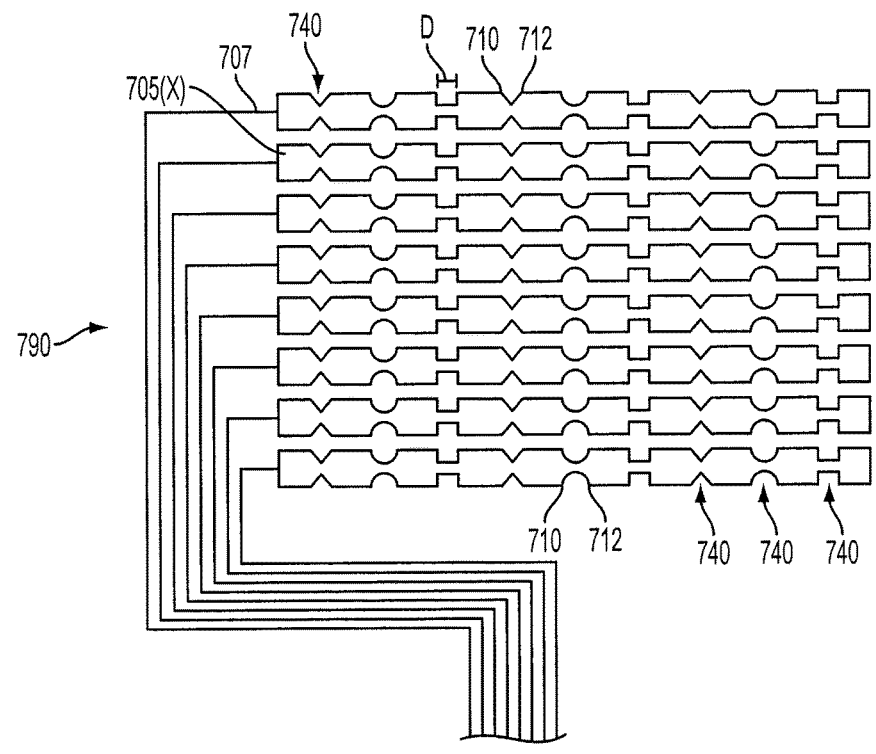
FIG. 3D illustrates schematically another set of drive electrodes for an exemplary position sensing panel.

The cut-out regions 740 can have various shapes. Although shown as rectangular notches in FIG. 3A, other shapes can also be used. For example and with reference to FIGS. 3B and 3C, triangular notches, semi-circular notches, and other shapes may be used. Also, with reference to FIG. 3D, multiple shapes can be used within a drive electrode 705(X). The spacing between the cut-outs 740 can also be varied. For example, the distance (D) from a first edge 710 to a second edge 712 of the cut-outs can vary. For example, the first edge 710 to second edge 712 distance (D) can be uniform within one drive electrode 705(X) but vary between different drive electrodes 705(X). As another example, the edge-to-edge distance (D) may vary along the length of any one of the different drive electrodes 705(X).

Also size of the cut-outs 740 can vary, either within one electrode or among the various drive electrodes 705(X). The first edge 710 to second edge 712 distance (D) of the cut-out sections 740 in the drive electrodes 705(X) can be made narrow to maintain the shielding ability of the drive electrodes 705(X) against noise arising from the underlying display. In some examples the first edge 710 to second edge 712 distance (D) of the cut-out section 740 may not be not greater than substantially 200 microns. Other sizes can also be used, depending on the application. In some examples, the first edge 710 to second edge 712 distance (D) of the at least some of the cut-out sections 740 may exceed 200 microns.

In some examples, the shape of the cut-outs 740 is designed to be substantially complimentary to the shape of the sense electrode 706(Y) in the region of cross over. For example, if the sense electrode 706(Y) tapers in width, then the cut-out sections 740 are shaped and sized to substantially match the tapered sense electrode 706(Y).

Connecting lines 707, which connect the drive electrodes 705(X) to a control unit, may be formed as part of the process of forming the auxiliary conductors, as described in more detail below.

Figure 4:
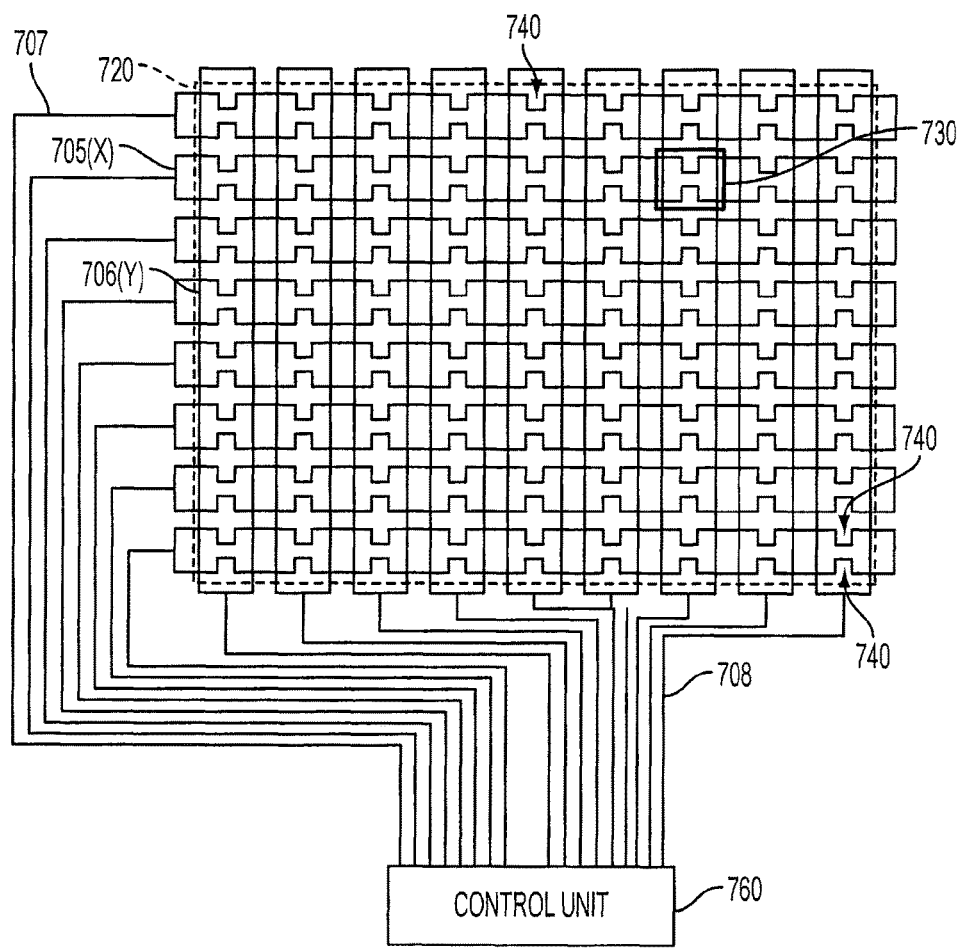
FIG. 4 illustrates schematically an arrangement of drive and sense electrodes of an exemplary position sensing panel.

With reference to FIG. 4 a position-sensing panel 790 having both drive electrodes 705(X) and sense electrodes 706(Y) is shown and described. As before, the drive electrodes 705(X) and the sense electrodes 706(Y) are formed by solid areas of ITO. Sensing area 720 of the position-sensing panel, denoted by the dotted line, encompasses each or substantially each of the intersections 730 formed by the X and Y electrodes. Moreover, the gaps between adjacent electrodes 705(X) are made narrow to enhance their shielding ability against noise arising from the underlying display. In some examples, about 90% of the sensing area 720 is covered by ITO. In such a configuration, the gap between adjacent ITO drive electrodes 705(X) may not be greater than substantially 200 microns. Other drive electrode 705(X) can be used depending on the width of the sense electrodes 706(Y).

In one example, the drive electrodes 705(X) are formed of ITO and shaped to form bars. Each bar forms channels with sense electrodes 706(Y) on the other side of the substrate 703. As mentioned above, there are intersections 730 where the drive electrodes 705(X) cross over the sense electrodes 706(Y) to form capacitive sensing nodes. At each intersection 730, the drive electrodes 705(X) have cut-out sections 740 substantially aligned with the centerlines of the intersecting sense electrodes 706(Y). The cut-out sections 740 extend partially across the width of the drive electrodes 705(X).

In the example of FIG. 4, the cut-out sections 740 in the drive electrodes 705(X) extend inwardly from both sides of the drive electrodes 705(X), and the cut-out sections 740 at each intersection 730 are symmetrically arranged about the centerlines of the drive electrodes 705(X) so that the drive electrodes 705(X) are unbroken along their centerlines. Other arrangements are possible. For example, the cut-out sections 740 can be arranged across the centerlines of the drive electrodes 705(X) so that the drive electrodes 705(X) are unbroken along their edges. Further, the cut-out sections 740 can be arranged asymmetrically with respect to the centerlines of the drive electrodes 705(X). For example, the cut-out sections 740 could each extend from one side of a drive electrode 705(X), leaving the drive electrode 705(X) unbroken on the other side. In this case, different cut-out sections 740 could extend from the same, or different, sides of a drive electrode 705(X).

As discussed above, a capacitive sensing node is formed at each intersection where a sensing electrode 705(Y) overlies a drive electrode 705(X). Each node has a node capacitance. For each node, this node capacitance can be regarded as being made up of two different components. The first component is the plate capacitance, which is the capacitance between the opposed parallel spaced apart surfaces of the sensing electrode 705(Y) and the drive electrode 705(X). The second component is the fringe capacitance, which is the capacitance between the other parts of the sensing electrode 705(Y) and the drive electrode 705(X) outside of the overlapping sections of the drive and sensing electrodes. The fringe capacitance can be produced by the electric fields acting between the sensing electrode 705(Y) and the drive electrode 705(X) in fringe areas near to the edges of the overlapping sections of the drive and sensing electrodes.

Figure 5A:
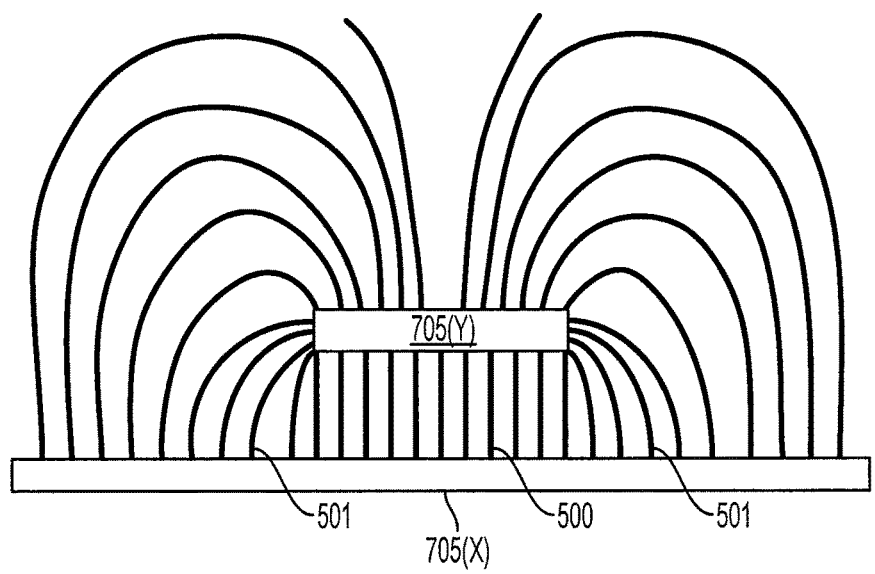
FIG. 5A illustrates schematically the electric fields at a node of an exemplary position sensing panel.

FIG. 5A shows a section taken along a drive electrode 705(X) through the center of the region where a sensing electrode 705(Y) and a drive electrode 705(X) overlap to define a node with some electric field lines. In FIG. 5A the drive electrode 705(X) is continuous and does not include any cut-out sections 740. The first component of the capacitance of the node is determined by the electric fields between the opposed parallel surfaces of the sensing electrode 705(Y) and the drive electrode 705(X) in the region 300. The second component of the capacitance of the node is determined by the electric fields between other parts of the sensing electrode 705(Y) and the drive electrode 705(X) near to the edges of the overlapping sections of the sensing electrode 705(Y) and the drive electrode 705(X), for example in fringe regions 501.

When an object, such as a finger or stylus, touches or is provided in close proximity to the surface of the touch-sensing panel 700, the resulting change in the node capacitance is predominantly due to changes in the fringe capacitance. The touching or close proximity of an object causes a relatively larger change in the fringe capacitance, while there is a relatively smaller change in the plate capacitance. The plate electric fields in the region 300 of the node between the directly opposed parallel spaced apart surfaces of the overlapping sections of the drive and sensing electrodes and away from the edges of the overlapping sections of the drive and sensing electrodes are less subject to change when an object touches the surface of the screen than the fringe electric fields between the drive and sensing electrodes outside of, and near to the edges of, the overlapping sections of the drive and sensing electrodes, for example in regions 301. In part this is because the electric fields between the directly opposed parallel spaced apart surfaces of the overlapping sections of the drive and sensing electrodes are shielded by the drive and sensing electrodes themselves.

Figure 5B:
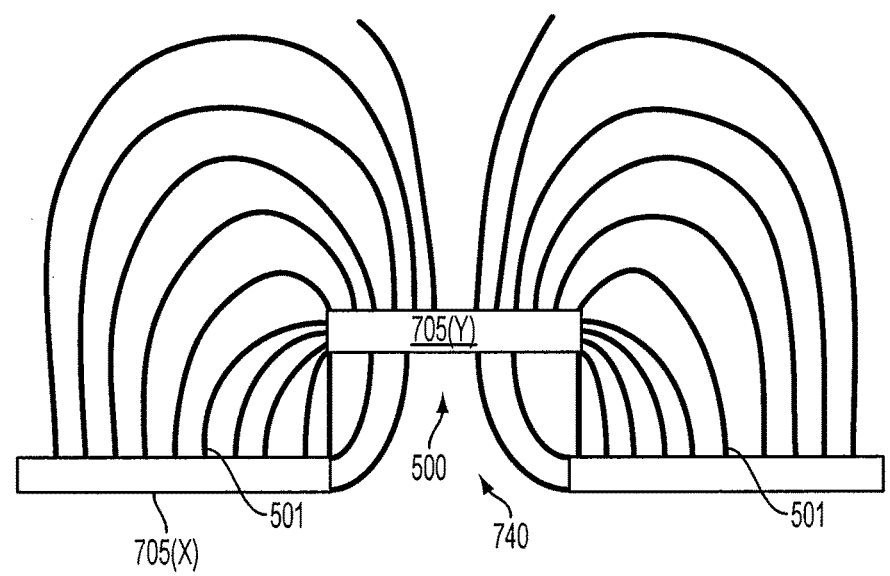
FIG. 5B illustrates schematically the electric fields at a node of an exemplary position sensing panel that includes one or more cut-out sections.

FIG. 5B shows a section taken along a drive electrode 705(X) having a cut-out section 740 through the center of the region where a sensing electrode 705(Y) and a drive electrode 705(X) overlap to define a node, and showing some electric field lines. The cut-out section 740 in the drive electrode 705(X) reduce the area of the opposed parallel spaced apart surfaces of the overlapping sections of the drive and sensing electrodes in the region 300, and so reduce the plate capacitance component of the node capacitance. However, the cut-out sections 740 have minimal effect on the fringe capacitance component of the node capacitance. Although the plate capacitance is reduced due to the cut-out, the total reduction in node capacitance is not equal to the reduction in plate capacitance because of the fringe electric fields that appear around the cut-out 740. As a result, the cut-out sections 740 reduce the proportion of the total node capacitance which is contributed by the plate capacitance component and increase the proportion of the total node capacitance which is contributed by the fringe capacitance component.

As is explained above, the touching or close proximity of an object causes a relatively larger change in the fringe capacitance than in the plate capacitance. Accordingly, the cut-out sections 740 reducing the proportion of the total node capacitance which is contributed by the plate capacitance and increasing the proportion which is contributed by the fringe capacitance has the effect of increasing the amount of change in the total node capacitance which is caused by the touching or close proximity of an object.

In some examples, the cut-outs 740 may reduce the total mutual capacitance of the drive and sense electrodes. The cut-outs 740 may also reduce the currents and electrical power used to operate the touch position-sensing panel.

In some examples, the cut-outs 740 may reduce the total mutual capacitance of the drive electrodes 705(X) and sense electrodes 706(Y) without reducing the mutual capacitance in the fringe region of the intersections. In some examples, the increase in the proportion of the total capacitance at the intersection, which is provided by the fringe electric field in the fringe regions of the node, can increase the sensitivity of the touch position-sensing panel, allow the resolution or sensing area of the touch position-sensing panel to be increased, and/or allow the thickness of the touch position-sensing panel to be reduced.

In some examples, the width of the cut-out sections 740 in the drive electrodes 705(X) is made substantially equal to the width of the intersecting sense electrodes 706(Y). This increases the reduction in the proportion of the total capacitance at the intersection which is provided by the non-fringe electric field in the non-fringe regions of the node. This increases the proportion of the total capacitance at the node which is provided by the fringe electric field in the fringe regions of the intersection.

In some examples, the width of the cut-out sections 740 in the drive electrodes 705(X) is smaller than the width of the intersecting sense electrodes 706(Y) so that each edge of the cut-out section 740 is a predetermined distance inside the respective edge of the intersecting sense electrode 706(Y). This distance can be selected to allow for possible alignment errors between the drive electrodes 705(X) and the intersecting sense electrodes 706(Y). The predetermined distances is selected so that possible alignment errors do not result in the edge of the cut-out section 740 being located outside the edge of the intersecting sense electrode 706(Y). Locating the edge of the cut-out section 740 outside the edge of the intersecting sense electrode 706(Y) may reduce the capacitance at the intersection which is provided by the fringe electric field in the fringe regions of the intersection.

Drive electrode connecting lines 707 are shown leading out from the drive electrodes 705(X) for connection to a control unit 760. Sense electrode connecting lines 708 are provided to connect sense electrodes 706(Y) to the same or a different control unit. The patterns of the connecting lines are shown by way of an example only.

Figure 6:
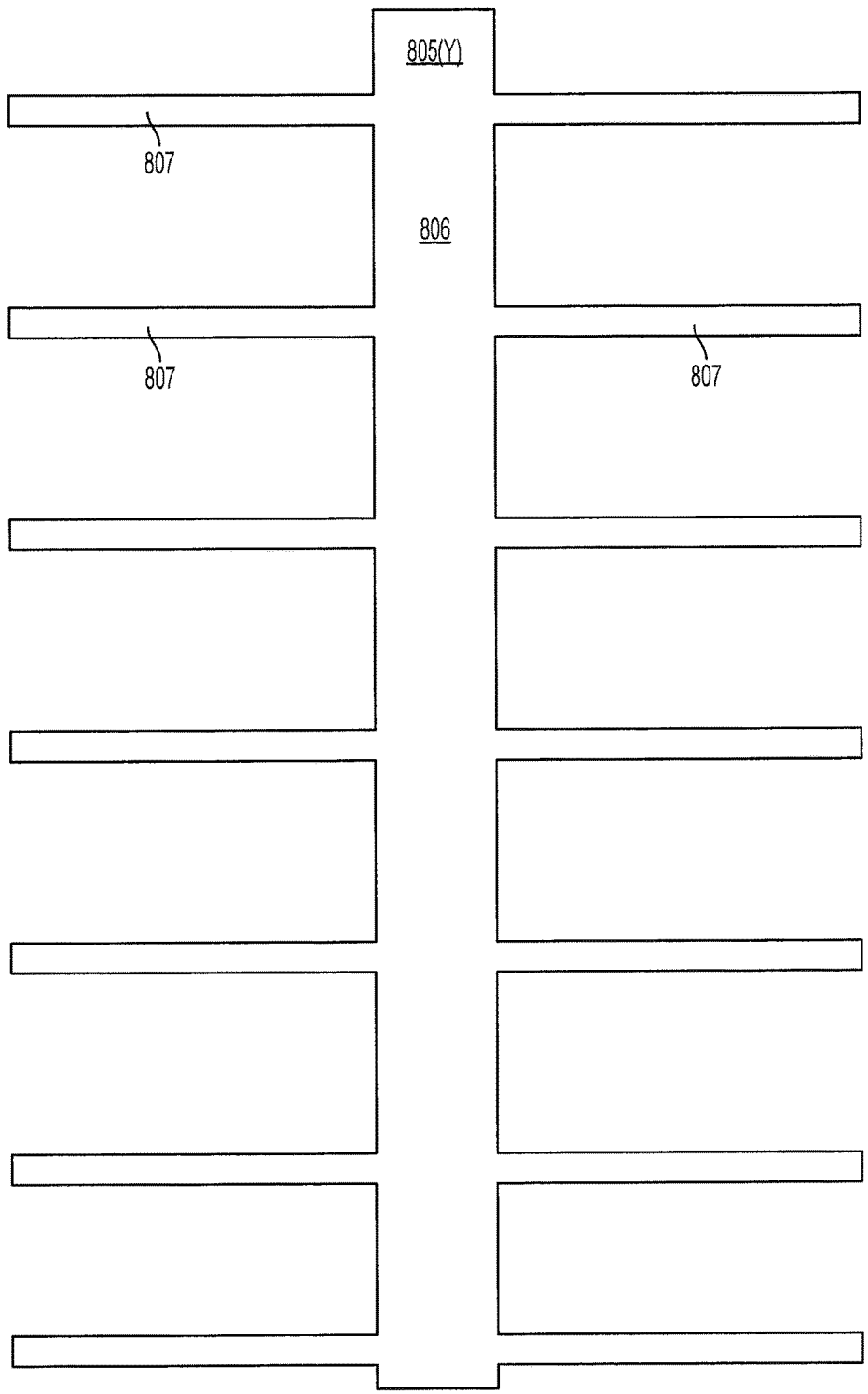
FIG. 6 illustrates schematically a portion of an arrangement of a sense electrode of another exemplary position sensing panel.
Figure 7:
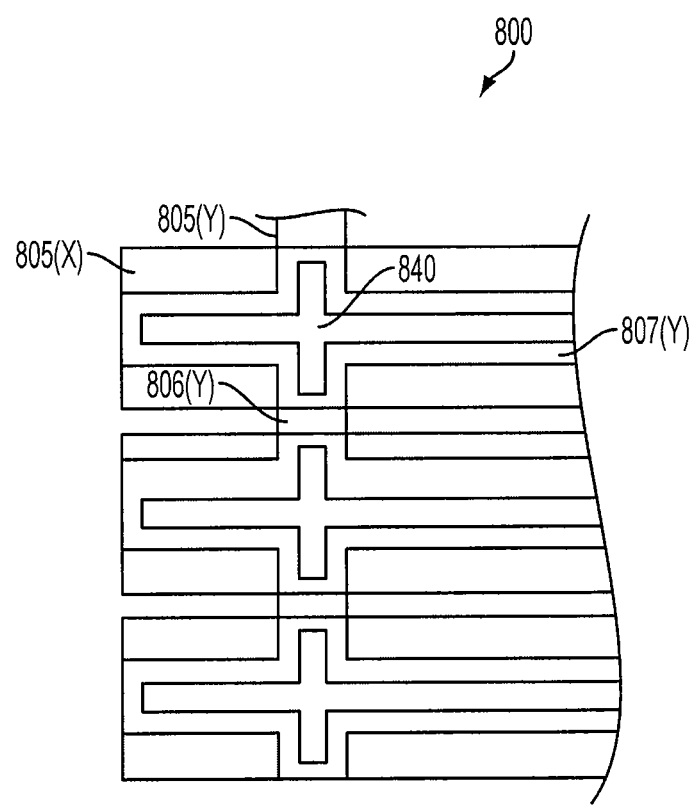
FIG. 7 illustrates schematically a portion of an arrangement of drive and sense electrodes of another exemplary position sensing panel.

FIG. 6 illustrates a part of another exemplary touch position-sensing panel 800. The panel 800 includes drive electrodes 805(X) and the sensing electrodes 805(Y) formed by solid areas of ITO. As shown in FIG. 6, the sensing electrode 805(Y) comprises a primary section 806 extending in the Y direction and a plurality of secondary crossbar sections 807 extending outwardly from the primary section 806 to both sides in the X direction. The primary section 806 and secondary crossbar sections 807 are arranged to overlay drive electrodes 805(X) to form intersections, where each intersection runs along a drive electrode 805(X). As shown in FIG. 7, in this embodiment the drive electrodes 805(X) have cut-out sections 840 aligned with the centerlines of both the primary section 806 and the secondary sections 807 of the sensing electrode 805(Y). The cut-out sections 840 are arranged across and along the centerlines of the drive electrodes 805(X) so that the drive electrodes 805 (X) are unbroken along their edges.

In FIG. 6 and FIG. 7, a single sense electrode 805(Y) is shown. There may be a number of sense electrodes 805(Y) arranged side by side in a complete touch position-sensing panel. Adjacent sense electrodes may have a similar pattern or may have a somewhat complimentary patter so that crossbar sections are interpolated.

In the illustrated examples, the drive electrodes 705(X) and 805(X) are rectangular strips with cut-out sections. As stated above, other arrangements are possible. In particular, the shape of the drive electrodes and the interconnection between the channels of any given electrode may be modified according to the type of touch with which the position-sensing panel is intended to be used. In one example, the electrodes may have saw-tooth or diamond shape edges with attendant inter-stripe gaps to facilitate field interpolation to aid in smoothing positional response.

The number of rows and columns shown is by way of illustration only, and the number shown is not limiting.

In some examples, the transparency of the position-sensing panel optionally transmits at least 85% of light having a wavelength in the visible part of the electromagnetic spectrum that is incident on the panel, in particular from a display underlying the panel.

The process of manufacturing a position-sensing panel of any of the types discussed above relative to FIGS. 1-7 includes the steps of patterning drive electrodes, such as ITO drive electrodes, on one substrate surface and patterning sense electrodes on the opposite surface of the same substrate. In the case where the drive electrodes 705(X) and sense electrodes 706(Y) are formed from ITO, the process of patterning the electrodes may include steps of: depositing a positive or negative resist over unpatterned ITO on a substrate; exposing the photoresist to UV light through a mask of the appropriate pattern; developing the resist by washing away unexposed resist with a solvent; etching away the exposed ITO areas using a suitable etchant; and finally removing the exposed photoresist using a suitable solvent.

One suitable etching liquid for use in removing exposed ITO is, for example, an etching acid. Examples of suitable removal liquids for the photoresist include organic solvents. Other suitable positive and negative photoresists, etching liquids and photoresist removal liquids may also be used.

Alternatively, ITO may be deposited on the substrate by sputtering ITO onto the substrate using a shadow mask having a pattern suitable for formation of electrodes in any of the various shapes as described above.

Lead-outs 707, 708 for connection of the sense electrodes to a control unit of the position-sensing panel may be formed by a printing process, such as inkjet printing, in which a conductive material or conductive material precursor is printed to form the Y electrode pattern and, in the case where a catalytic precursor ink is used, treating the precursor ink to convert the precursor ink to the final conductive material, for example by electroless plating. Alternatively the substrate may be uniformly coated with a catalytic photosensitive ink which is exposed to UV light through a photomask or vector-exposed to UV light from a laser or other suitable light source, rinsed with solvent to wash away the unexposed ink, then immersing the remaining ink in a metal plating bath to form the fine conductive traces. Suitable catalytic inks are commercially available.

Lead-outs 707, 708 for connection of the sense and drive electrodes to a control unit of the position-sensing panel may be formed in the same process steps as formation of the sense and drive electrodes.

Auxiliary conductors, where present (for example as in FIG. 5), may be formed in the same way as the sense electrodes. In one example, a similar method (e.g. evaporation or printing) is used to form both the sense electrodes and auxiliary conductors in order to simplify manufacture of the position-sensing panel.

Although some exemplary processes are given above for forming drive electrodes, sense electrodes and auxiliary conductors, other suitable methods can also be used.

The touch position sensors described above can be attached to numerous electronic devices, such as computers, personal digital assistants (PDA), satellite navigation devices, mobile phones, portable media players, portable game consoles, public information kiosks, point of sale systems, and the like. These electronic devices may include a central processor or other processing device for executing program instructions, an internal communication bus, various types of memory or storage media (RAM, ROM, EEPROM, cache memory, disk drives etc.) for code and data storage, and one or more network interface cards or ports for communication purposes.

While the above discussion is pertinent to mutual capacitance drive approaches, self-capacitance drive methods may be similarly improved by application of the technologies discussed in the examples above.

Various modifications may be made to the examples described in the foregoing, and any related teachings may be applied in numerous applications, only some of which have been described herein. It is intended by the following claims to claim any and all applications, modifications and variations that fall within the true scope of the present teachings.

What is claimed is:

1. A touch panel comprising:
   a plurality of first electrodes formed of a first conductive material and arranged in a first direction in a sensing area of the panel; and
   a plurality of second electrodes formed of a second conductive material and arranged in a second direction different from the first direction such that the first and second electrodes cross over each other to form touch sensing nodes in the sensing area,
   wherein:
      the plurality of first electrodes and the plurality of second electrodes are separated by at least one substrate; and
      each respective first electrode includes a plurality of shaped cut-out portions, each shaped cut-out portion extending at least partially across the respective first electrode and located where a second electrode intersects and crosses over in plan view the respective first electrode such that the second electrode overlaps in plan view the shaped cut-out portion, the shaped cut-out portion having a width that is less than a width of the second electrode such that the shaped cut-out portion is subsumed, in plan view, by a perimeter of the second electrode.

2. The touch panel of claim 1 wherein the first conductive material and the second conductive material are the same.

3. The touch panel of claim 2 wherein one of the first conductive material and the second conductive material comprises ITO.

4. The touch panel of claim 1 wherein the plurality of cut-out portions are rectangular in shape.

5. The touch panel of claim 1 wherein the plurality of cut-out portions includes a plurality of shapes.

6. The touch panel of claim 1 wherein each first electrode is a drive electrode and each second electrode is a sense electrode.

7. The touch panel of claim 1 wherein each first electrode is a sense electrode and each second electrode is a drive electrode.

8. The touch panel of claim 1 wherein at least one of the plurality of cut-out portions extends substantially the full width of the second electrode.

9. The touch panel of claim 1, wherein the plurality of second electrodes overlay the plurality of first electrodes.

10. A position sensor comprising:
a controller; and
a touch panel in communication with the controller; the touch panel comprising:
    a plurality of first electrodes formed of a first conductive material and arranged in a first direction in a sensing area of the panel; and
    a plurality of second electrodes formed of a second conductive material and arranged in a second direction different from the first direction such that the first and second electrodes cross over each other to form touch sensing nodes in the sensing area,
wherein:
    the plurality of first electrodes and the plurality of second electrodes are separated by at least one substrate; and
    each respective first electrode includes a plurality of shaped cut-out portions, each shaped cut-out portion extending at least partially across the respective first electrode and located where a second electrode intersects and crosses over in plan view the respective first electrode such that the second electrode overlaps in plan view the shaped cut-out portion, the shaped cut-out portion having a width that is less than a width of the second electrode such that the shaped cut-out portion is subsumed, in plan view, by a perimeter of the second electrode.

11. The position sensor of claim 10 wherein the first conductive material and the second conductive material are the same.

12. The position sensor of claim 10 wherein the plurality of cut-out portions are rectangular in shape.

13. The position sensor of claim 10 wherein the plurality of cut-out portions includes a plurality of shapes.

14. The position sensor of claim 10 wherein each first electrode is a drive electrode and each second electrode is a sense electrode.

15. The position sensor of claim 10 wherein each first electrode is a sense electrode and each second electrode is a drive electrode.

16. The position sensor of claim 10 wherein at least one of the plurality of cut-out portions extends substantially the full width of the second electrode.

17. A method of forming a touch panel comprising:
forming a first conductive layer comprising a plurality of first electrodes, on a first side of a substrate in a first direction; and
forming a second conductive layer comprising a plurality of second electrodes, on a second side of the substrate in a second direction different from the first direction, such that the first and second electrodes cross over each other to form touch sensing nodes in a sensing area of the touch panel,
wherein the forming of the second conductive layer includes forming a plurality of cut-out portions in at least one the first electrodes, each cut-out portion extending at least partially across the at least one of the first electrodes and located where at least one the second electrodes intersects and crosses over in plan view the at least one of the first electrodes such that the second electrode overlaps in plan view the shaped cut-out portion, the shaped cut-out portion having a width that is less than a width of the second electrode such that the shaped cut-out portion is subsumed, in plan view, by a perimeter of the second electrode.

18. The method of claim 17 wherein the forming of the second conductive layer comprises:
depositing ITO (Indium Tin Oxide) on the first side of the substrate;
depositing a photoresist over the ITO;
exposing the photoresist to light through a mask of a pattern for the first electrodes including the cut-out;
developing the photoresist;
etching away the exposed ITO; and
removing the exposed photoresist.

19. The method of claim 17 wherein the forming of the second conductive layer comprises depositing ITO on the first side of the substrate by sputtering in a pattern for the first electrodes including the cut-out.

20. A method of forming a touch panel comprising:
forming a first conductive layer comprising a plurality of first electrodes, on a side of a first substrate in a first direction; and
forming a second conductive layer comprising a plurality of second electrodes, on a side of a second substrate in a second direction different from the first direction, such that the first and second electrodes cross over each other to form touch sensing nodes in a sensing area of the touch panel,
wherein the forming of the second conductive layer includes forming a plurality of cut-out portions in at least one the first electrodes, each cut-out portion extending at least partially across the at least one of the first electrodes and located where at least one the second electrodes intersects and crosses over in plan view the at least one of the first electrodes such that the second electrode overlaps in plan view the shaped cut-out portion, the shaped cut-out portion having a width that is less than a width of the second electrode such that the shaped cut-out portion is subsumed, in plan view, by a perimeter of the second electrode.

21. The method of claim 20 wherein the forming of the second conductive layer comprises depositing ITO on the side of the second substrate by sputtering.

* * * * *